(12) United States Patent
Miyasaka et al.

(10) Patent No.: US 7,863,409 B2
(45) Date of Patent: Jan. 4, 2011

(54) METHOD OF SEPARATING RESIN

(75) Inventors: Masatoshi Miyasaka, Osaka (JP); Tamao Kojima, Osaka (JP); Akira Isomi, Osaka (JP); Daisuke Tabata, Osaka (JP); Hiroyuki Naka, Osaka (JP); Yasuhiko Sakai, Hyogo (JP)

(73) Assignee: Panasonic Corporation, Osaka (JP)

( * ) Notice: Subject to any disclaimer, the term of this patent is extended or adjusted under 35 U.S.C. 154(b) by 202 days.

(21) Appl. No.: 12/261,091

(22) Filed: Oct. 30, 2008

(65) Prior Publication Data

US 2009/0120579 A1 May 14, 2009

(30) Foreign Application Priority Data

Nov. 14, 2007 (JP) ............................. 2007-294982
May 15, 2008 (JP) ............................. 2008-127783

(51) Int. Cl.
*C08F 6/00* (2006.01)
*C08J 3/00* (2006.01)
(52) U.S. Cl. ..................... 528/480; 156/344; 528/481
(58) Field of Classification Search ................. 156/344; 528/480, 481
See application file for complete search history.

(56) References Cited

U.S. PATENT DOCUMENTS

2007/0286833 A1* 12/2007 Keller et al. ............. 424/70.11

FOREIGN PATENT DOCUMENTS

| DE | 92 00 280 | 4/1992 |
| JP | 11-226957 | 8/1999 |
| JP | 2002-046128 | 2/2002 |
| JP | 2002-234031 | 8/2002 |
| WO | WO 03/090941 | 11/2003 |

* cited by examiner

*Primary Examiner*—Terressa M Boykin
(74) *Attorney, Agent, or Firm*—Steptoe & Johnson LLP

(57) ABSTRACT

A separation object including at least two types of resins with different glass transition temperatures (glass transition temperature of a first resin 1<glass transition temperature of a second resin 2) is placed on a separating member 3. Next, primary heating is applied at a temperature between the glass transition temperatures of the first resin 1 and the second resin 2, and pressurization is additionally performed to cause the first resin 1 to adhere to the separating member 3. Subsequently, a heat history of secondary heating at a temperature higher than the primary heating temperature is applied to detach and recover the second resin 2 by restoring the shape of the second resin 2, while the first resin 1 adhering to and retained by the separating member 3 is detached by a blade 5 and the like for recovery.

14 Claims, 13 Drawing Sheets

PRIMARY HEATING

SECONDARY HEATING

TERTIARY HEATING

PRIMARY HEATING

SECONDARY HEATING

TERTIARY HEATING

METHOD OF SEPARATING RESIN

FIELD OF THE INVENTION

The present invention relates to a technique for separating a resin from a separation object including a mixture of resin fragments in order to enable recycling of used home appliances as resources.

BACKGROUND OF THE INVENTION

Recent economic activities of mass production, mass consumption and mass disposal have been causing global environmental problems such as global warming and depletion of resources. In such circumstances, with the intention of constructing a recycling-oriented society, the Home Appliance Recycling Law was enforced in April, 2001, making it obligatory to recycle used air conditioners, television receivers, refrigerators/freezers, and washing machines.

Conventionally, home appliances no longer required are first crushed at a home appliance recycling factory, and subsequently separated and recovered by material utilizing magnetic force, wind power, vibration, or the like to be reused as resources. In particular, a high recycling rate is achieved for metal materials, by recovering materials such as iron, copper and aluminum on a per-material basis at high purities using a gravity separator or a magnetic separator.

On the other hand, as for resin materials, polypropylene (hereinafter referred to as PP) with a low specific gravity is separated from materials with high specific gravities through gravity separation utilizing water and is recovered at a relatively high purity. However, the gravity separation utilizing water is considerably disadvantageous in that a large amount of effluent is produced and in that polystyrene (hereinafter referred to as PS) and acrylonitrile butadiene styrene (hereinafter referred to as ABS) which have similar specific gravities cannot be separated. Furthermore, in recent years demand for filler-added polypropylene with a high specific gravity has expanded, and the conventional gravity separation is incapable of meeting the demand.

Separating methods taking into consideration the aforementioned disadvantages regarding the recycling of resin materials are proposed in Japanese Utility Model Laid-Open No. 4-126822 and Japanese Patent Laid-Open No. 2002-234031.

The separating method proposed in Japanese Utility Model Laid-Open No. 4-126822 utilizes a difference between melting temperatures of two types of resins to be separated, and separates the two types of resins from each other by heating a pair of peripheral moving surfaces made of heat-resistant steel so as to reach the intermediate temperature of the melting temperatures of the two types of resins to be separated, and passing the two types of resins to be separated through a gap between the heated peripheral moving surfaces to allow only one of the resins whose melting temperature is lower to adhere to the heated peripheral moving surfaces.

Furthermore, the separating method proposed in Japanese Patent Laid-Open No. 2002-234031 utilizes a difference in dielectric loss between resin materials. The separating method performs separation by subjecting a separation object including a mixture of at least two types of resins to dielectric heating with the application of an electromagnetic wave or the like, and utilizing a difference between the melting characteristics of the resin materials based on a difference between the heating properties of the respective resin materials. The separating methods described above do not produce effluent and are not affected by the specific gravities of the resin materials.

DISCLOSURE OF THE INVENTION

However, in Japanese Utility Model Laid-Open No. 4-126822, a low-polarity molecule substance such as PP or PS whose adherence to other substances is poor results in a melted resin with an unstable adhesive strength, preventing separation from being performed at a high purity. In addition, when a resin with a low melting point and a resin with a high melting point simultaneously pass through the gap between the heated peripheral moving surfaces, the unmelted resin with the high melting point adheres to the melted resin with the low melting point, disadvantageously making separation impossible.

Furthermore, (Japanese Patent Laid-Open No. 2002-234031) is incapable of separating resin materials with similar dielectric loss characteristics and is therefore difficult to perform recovery at a high purity.

The present invention solves the above-described conventional problems, and an object of the present invention is to provide a method of separating a resin which does not produce effluent and is not affected by the specific gravities and dielectric loss characteristics of resin materials.

A method for separating resin according to a first aspect of the present invention includes the steps of: placing a separation object including a mixture of at least two types of resins having different glass transition temperatures and yield stresses on a separating member and applying primary heating and pressure to the separation object at a primary heating temperature set lower than the glass transition temperature of at least one resin among the resins and higher than the glass transition temperature of at least one resin among the resins and under a pressurizing force set so as to be equal to or exceed the compressive yield stress of a resin whose compressive yield stress is the highest among resins having glass transition temperatures lower than the primary heating temperature, causing at least a resin having a glass transition temperature lower than the primary heating temperature to adhere to the separating member, and detaching a resin not adhering to the separating member or a resin with low adhesion from the separating member; and applying secondary heating to the separating member to which the resin adheres at a secondary heating temperature set higher than the primary heating temperature and lower than the melting temperature of a resin whose melting temperature is the lowest among the separation object, causing only a resin whose glass transition temperature is lower than the primary heating temperature to adhere to the separating member, and detaching the resin adhering to the separating member from the separating member to separate the resin.

Furthermore, the primary heating temperature is set to a temperature between the glass transition temperature of a resin whose glass transition temperature is the lowest and the glass transition temperature of a resin having the second lowest glass transition temperature among the at least two types of resins having different glass transition temperatures and yield stresses.

Furthermore, the primary heating temperature is set to a temperature between the glass transition temperature of a resin whose glass transition temperature is the highest and the glass transition temperature of a resin having the second highest glass transition temperature among the at least two types of resins having different glass transition temperatures and yield stresses.

Furthermore, the pressurizing force is equal to or greater than 1.2 times the compressive yield stress.

Furthermore, a difference between the maximum thickness and the minimum thickness of a resin in a pressure direction when placing the separation object onto the separating member is equal to or less than 5.5 mm.

Furthermore, the thickness of a resin in a pressure direction when placing the separation object onto the separating member ranges from 0.5 mm to 6.0 mm, both inclusive.

Furthermore, the thickness of a resin in a pressure direction when placing the separation object onto the separating member ranges from 1.0 mm to 6.0 mm, both inclusive.

Furthermore, the thickness of a resin in a pressure direction when placing the separation object onto the separating member ranges from 1.0 mm to 3.0 mm, both inclusive.

Furthermore, the rate of temperature increase during the secondary heating of a resin whose glass transition temperature is lower than the primary heating temperature is lower than the rate of temperature increase during the secondary heating of a resin whose glass transition temperature is higher than the primary heating temperature.

Furthermore, the heating duration of a resin whose glass transition temperature is lower than the primary heating temperature at an elevated/reached temperature is reduced by at least 5 seconds compared to a resin whose glass transition temperature is higher than the primary heating temperature and the heatup period of the resin whose glass transition temperature is lower than the primary heating temperature is set to 60 seconds at the most by reducing the rate of temperature increase during the secondary heating of the resin whose glass transition temperature is lower than the primary heating temperature in comparison to the rate of temperature increase of the resin whose glass transition temperature is higher than the primary heating temperature.

Furthermore, the separation object includes at least any one type of polypropylene, polyethylene, polylactate, polyvinyl chloride, polystyrene, acrylonitrile styrene, acrylonitrile butadiene styrene, and polycarbonate.

Furthermore, the separation object includes polypropylene and at least any one type of polystyrene and acrylonitrile butadiene styrene.

Furthermore, the separation object includes polypropylene and at least any one type of polystyrene and acrylonitrile butadiene styrene, the primary heating temperature is set to at least 15 degrees C. and lower than glass transition temperatures of all resin types other than polypropylene included in the separation object, and the secondary heating temperature is set to a range from 70 degrees C. to 155 degrees C., both inclusive, and set higher than the primary heating temperature.

Furthermore, the separation object includes polypropylene and at least any one type of polystyrene and acrylonitrile butadiene styrene, the primary heating temperature is set to at least 15 degrees C. and lower than glass transition temperatures of all resin types other than polypropylene included in the separation object, and the secondary heating temperature is set to a range from 100 degrees C. to 155 degrees C., both inclusive, and set higher than the primary heating temperature.

With the configuration described above, by placing a resin separation object having a thickness that is within the set range on a separating member and performing heating and pressurization at a temperature between glass transition temperatures of resins constituting the separation object, the separation object can be separated into a resin having a glass transition temperature that is higher than a heating temperature and a resin having a glass transition temperature that is lower than the heating temperature. Consequently, desired resins can now be separated at high purity from the separation object which have been inseparable using conventional techniques.

DESCRIPTION OF THE EMBODIMENTS

First Embodiment

FIGS. 1 to 14 present a first embodiment of the present invention.

FIGS. 1A to 1F show processes of separating resin from a separation object including a mixture of two types of resin having different glass transition temperatures and yield stresses, namely, a first resin 1 and a second resin 2.

Figure 1A:
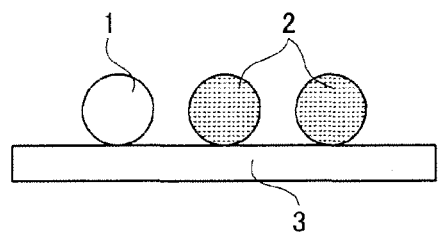
FIGS. 1A to 1F are cross-sectional process drawings showing a method of separating resin according to a first embodiment of the present invention.

In FIG. 1A, the separation object is placed on a separating member 3. In this case, the glass transition temperature of the first resin 1 is lower than the glass transition temperature of the second resin 2.

Figure 1B:
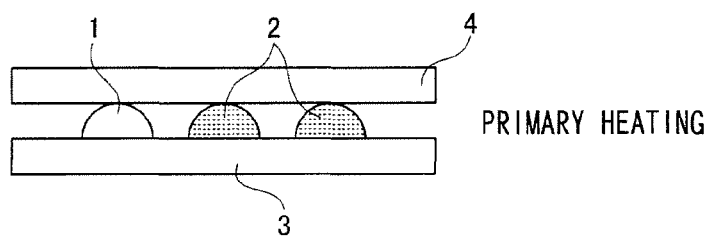

In FIG. 1B, primary heating is applied. At this point, a heating temperature is set to a temperature between the glass transition temperatures of the first resin 1 and the second resin 2.

The first resin 1 and the second resin 2 are pressed against the separating member 3 by a flat plate 4. The pressurizing force of the flat plate 4 is equal to or greater than the compressive yield stress of the first resin 1. By heating and pressurizing the first resin 1 and the second resin 2 in this state, at least the first resin 1 adheres to the separating member 3. In other words, since the first resin 1 is heated and pressurized at this point at a temperature equal to or greater than the glass transition temperature and under a force equal to or greater than the compressive yield stress, the first resin 1 plastically deforms and adheres to the separating member 3. In addition, when the pressurizing force of the heating and pressurizing is equal to or greater than the compressive yield stress of the second resin 2, the second resin 2 also deforms in shape and adheres to the separating member 3. However, since the deformation occurs at a temperature lower than the glass transition temperature, by applying a heat history higher than the primary pressurizing temperature after pressure release, the shape of the second resin 2 is restored to a state before pressurization and the second resin 2 detaches itself from the separating member 3. Furthermore, when the pressurizing force of the heating and pressurizing is smaller than the compressive yield stress of the second resin 2, the second resin 2 does not adhere to the separating member 3. Moreover, a favorable adhesive strength can be attained by using a plate member having a patterned indented surface such as a metallic mesh or a punched metal as the separating member 3.

Figure 1C:
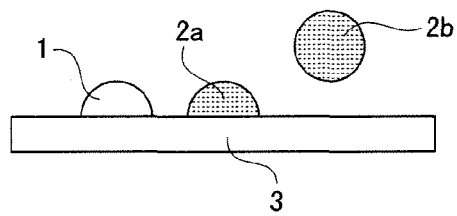

Next, by releasing the pressurizing force as shown in FIG. 1C, a resin adhering to the separating member 3 and a resin not adhering to the separating member 3 can be separated from each other by inclining or minutely vibrating the separating member 3. In this case, the second resin 2b not adhering to the separating member 3 detaches itself from the separating member 3. The second resin adhering to the separating member 3 is shown by reference character 2a.

Moreover, when a material that does not adhere to the separating member 3 under the heating and pressurization of FIG. 1B (such as metal, paper, wood fragments, or a thermosetting resin) is included in the separation object, the material can be separated and removed from the first resin 1 and the second resin 2a which adhere to the separating member 3 as a non-adhering material in the same manner as the second resin 2b.

Figure 1D:
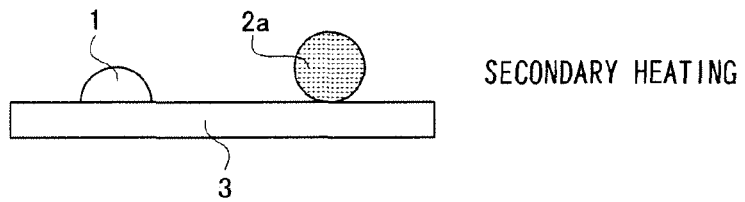
Figure 1E:
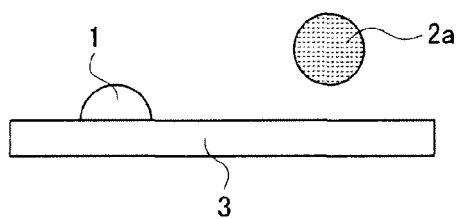

Next, in FIG. 1D, secondary heating is applied at a temperature that is higher than the primary heating temperature and lower than a melting point of whichever resin whose melting point is lower among the first resin 1 and the second resin 2. Consequently, since the shape of the second resin 2a having adhered to the separating member 3 is restored to a state before pressurization and the second resin 2a is in a detached state from the separating member 3 or a state where the adhesive strength to the separating member 3 is significantly low, the second resin 2a can be separated from the first resin 1 adhering to the separating member 3, as shown in FIG. 1E, by inclining or minutely vibrating the separating member 3.

The primary heating and the second heating described above may also be performed by bringing the separating member 3 into contact with a hot plate, or a radiation method, a hot-air method or the like can be adopted without limitation.

Figure 1F:
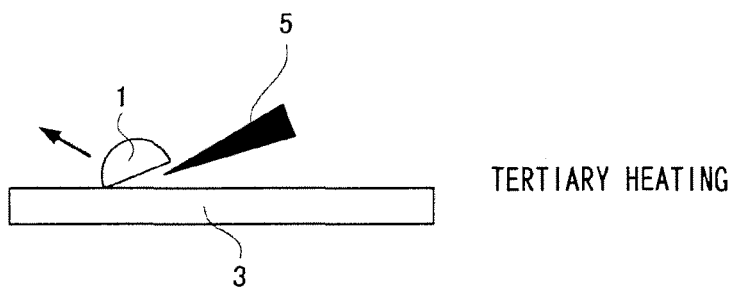

Next, in FIG. 1F, the first resin 1 adhering to the separating member 3 can be recovered by scratching with a blade 5 or the like. At this point, the first resin 1 can be easily separated from the separating member 3 by applying tertiary heating to the first resin 1 to reduce a modulus of elasticity of the first resin 1.

Generally, when applying heat to a resin material, a narrow temperature range exists at which, from a stiff and non-fluid state at a low temperature, stiffness decreases while fluidity increases rapidly. A temperature at which such changes in solid state properties occur is referred to as a glass transition temperature.

[Table 1] presented hereunder show measurements of glass transition temperatures of PP, PE, PLA, PVC, PS, AS, ABS and PC taken by a differential scanning calorimeter manufactured by Seiko Instruments Inc. (model: DSC220). Clear differences between glass transition temperatures of the different resins were identified.

TABLE 1

| | Resin type | | | | | | | |
|---|---|---|---|---|---|---|---|---|
| | PE | PP | PLA | PVC | PS | AS | ABS | PC |
| Product number | CAT#041 | J-380A | LACEA H-100J | VU50 | MW2C | CAT#495 | EX18Z | GSH2030SRGSH |
| Manufacturer | SP2 | HONAM PETROCHEMICAL CORP. | MITSUI CHEMICALS, INCORPORATED | NIHON PLASTIC | TOYO STYRENE CO., LTD. | SP2 | UMG | MITSUBISHI ENGINEERING PLASTICS CORPORATION |
| Glass transition temperature | −140° C. | −20° C. | 60° C. | 84° C. | 98° C. | 106° C. | 118° C. | 147° C. |

In the table, abbreviations SP2 and UMG respectively stand for Scientific Polymer Products, Inc. (U.S.A.) and UMG ABS, Ltd.

When pressurizing a resin material and increasing the pressurizing force, once entering a region equaling or surpassing an elastic limit of the resin material, a point (yield point) is reached where displacement (strain) rapidly begins to increase in reaction even to a slight increase in pressurizing force. The pressurizing force at the moment where the point is reached shall be hereby defined as a compressive yield stress.

Figure 2:
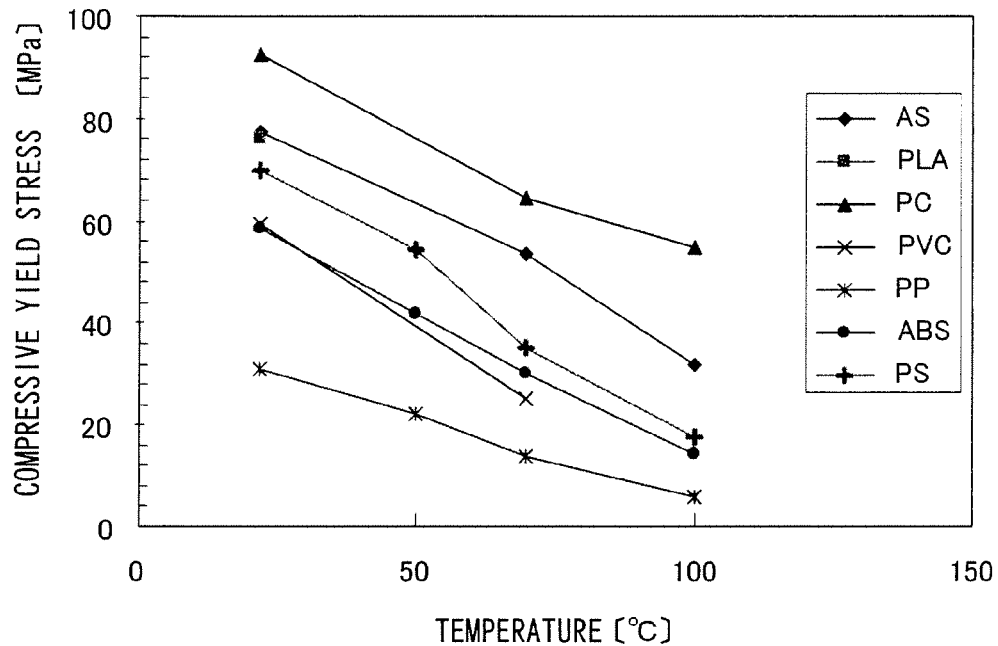
FIG. 2 is an explanatory diagram showing measurements of compressive yield stress of each resin at different temperatures according to the first embodiment.

FIG. 2 is a diagram showing measurements of compressive yield stresses of each resin material shown in [Table 1] taken at different temperatures using a compressive stress measuring instrument manufactured by TOKYO KOKI SEIZOSHO LTD. (model: TCM10000 (compressive load velocity 1 mm/min)).

With each resin material, compressive yield stress decreased as the temperature rose to equal or to fall below a measurement limit once reaching or exceeding the glass transition temperature. This is due to the fact that the fluidity of a resin increases rapidly once reaching or exceeding a glass transition temperature, confirming that, with each resin, compressive deformation readily occurs under a low pressurizing force at temperatures equaling or exceeding the glass transition temperature.

Example 1

A method of separating desired resin from a separation object including PP and PS will now be described.

In this case, PP is assumed to be a first resin 1 and PS a second resin 2.

A separating member 3 and the separation object were placed on a pressure plate of a flat plate pressing machine, and were pressurized for 60 seconds after inserting a 3.0 mm spacer so as to have a predetermined thickness. Subsequently, by removing resin having a thickness of 1.0 mm or less, a thickness in the pressure direction was equalized to a range from 1.0 mm to 3.0 mm, both inclusive.

Moreover, a resin thickness can also be equalized to a desired thickness using a roll compression method instead of a flat plate pressing machine. In the case of a roll, a resin thickness can be continuously equalized using a vertical roll or a horizontal roll. Equalization of resin thickness can be performed efficiently by suitably optimizing a roll gap, a roll diameter, a roll rotational frequency, and a number of rolls.

As the separating member 3, a stainless steel mesh with a mesh opening of 0.28 mm, a wire diameter of 0.23 mm, and a size of 150 mm by 150 mm was used.

Next, the separation object was placed on the separating member 3 so as to cover 45 to 55 percent of the entire area of the separating member 3 so that resins did not overlap each other. The separating member 3 was placed on a heat plate of a heat press machine and subjected to primary heating at 70 degrees C., followed by heating and pressurization for 30 seconds under a pressurizing force of 20,000 kgf.

The separating member 3 on which was placed the separation object subjected to heating and pressurization was next placed on a hot plate and subjected to secondary heating for 20 seconds at 150 degrees C., and the separating member 3 was inclined to separate and recover the second resin 2.

Next, the separating member 3 from which the second resin 2 had been separated and removed was placed on the hot plate to be subjected to tertiary heating for 30 seconds at 150 degrees C. At the same time, a stainless blade having a thickness of 1 mm was used on the hot plate to scrape off PP from the first resin 1 adhering to the separating member 3 for detachment and recovery.

Qualitative analysis was performed on the resins separated by the secondary heating and the tertiary heating using an infrared absorption analyzer to verify a resin separation quality. As a result, the resin detached by the secondary heating was found to be PS with a purity of 100%, and the resin scratched off by the blade during the tertiary heating was found to be PP with a purity of 100%.

More preferably, particle diameters of the separation object are equalized using a sieve before equalization to a predetermined thickness is performed. Particle diameters of the separation object can be equalized to within a certain range by first removing coarse items from the separation object using a sieve with a mesh opening of 8.5 mm and next removing small mixed fragments and powders from the separation object using a sieve with a mesh opening of 1.0 mm.

Moreover, a tendency is observed in which the higher the primary heating temperature, the greater the adhesive strength of resins, and the higher the second and third heating temperatures, the easier resins are detached. However, when heating is performed at a temperature equal to or greater than the melting point of a resin in the separation object, complete adhesion and detachment are impeded due to melting of the resin and efficient separation cannot be performed. Therefore, the heating temperature must not exceed the melting point of a resin whose melting point is the lowest among the separation object.

Hereinafter, influences of a pressurizing force, primary and secondary heating temperatures, a resin thickness, and impurities during heating and pressurization upon a resin separation quality will be described in sequence.

—Influence of Pressurizing Force During Heating and Pressurization—

Figure 3:
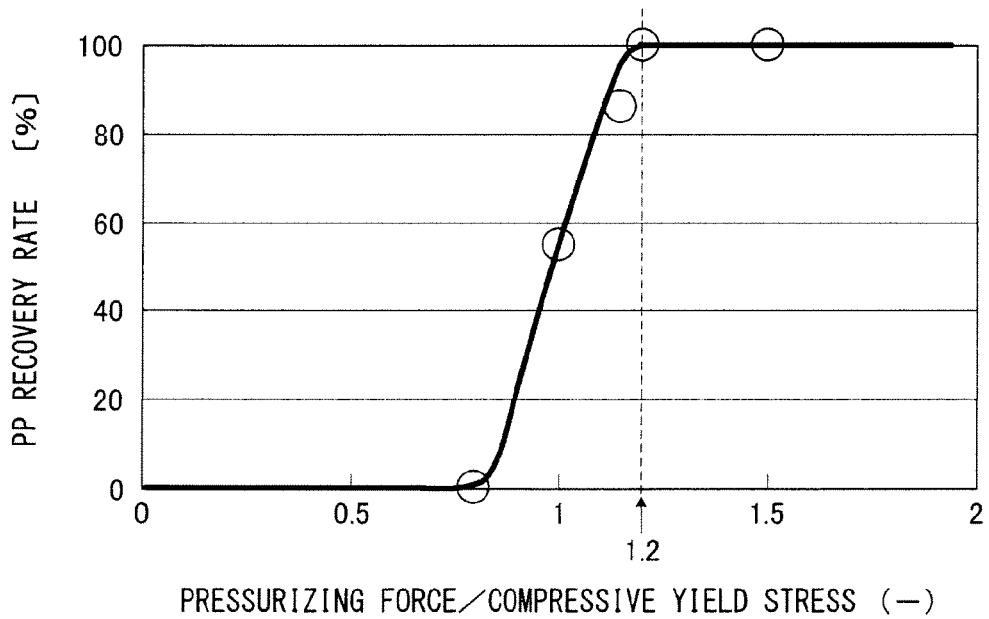
FIG. 3 is a relationship diagram of pressurizing force and PP recovery rate according to the first embodiment.

FIG. 3 is a diagram showing a relationship between pressurizing force and PP recovery rate during heating and pressurization in separation of an separation object including PP and PS. The abscissa represents a ratio of pressurizing force applied to the separation object at the primary heating temperature among PP compressive yield stress at the primary heating temperature. PP recovery rate (%) represented by the ordinate is a percentage (%) of a PP quantity recovered through tertiary heating among a total quantity of PP included in the separation object.

As shown in FIG. 3, it was found that PP recovery rate increases as the pressurizing force increases. Setting the pressurizing force so as to be equal to or greater than the compressive yield stress of PP allows PP to adhere to and be retained by the separating member and enables recovery of PP from the separation object. In addition, it was found that the pressurizing force applied to PP is preferably equal to or greater than 1.2 times a compressive yield stress at which a 100% PP recovery rate is attained.

Similar verifications conducted on resins other than PP which are listed in [Table 1] revealed that, for every resin, recovery became possible under a pressurizing force equal to or greater than the compressive yield stress, and a high recovery rate was attained under a pressurizing force equal to or greater than 1.2 times the compressive yield stress.

Since an excessively large pressurizing force causes deficiencies such as damage to the separating member, increases in load borne by equipment, destruction of resins and the like, an upper limit is set in accordance with specifications of the separating member or the equipment.

—Influence of Primary Heating Temperature—

Figure 4:
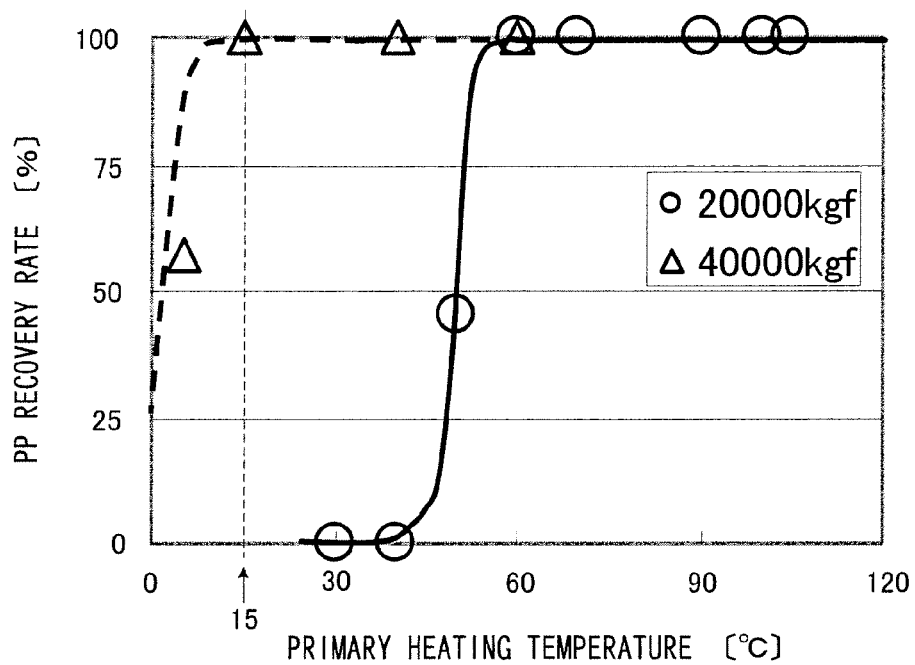
FIG. 4 is a relationship diagram of primary heating and PP recovery rate in a separation object according to the first embodiment.
Figure 5:
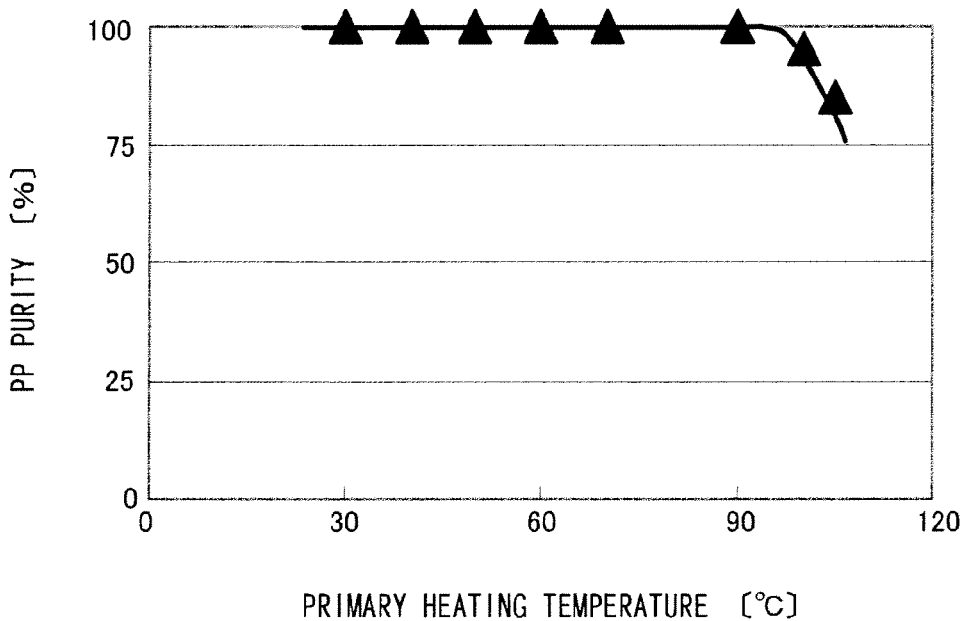
FIG. 5 is a relationship diagram of primary heating and PP purity in a PP-PS separation object.

FIG. 4 is a diagram showing a relationship between primary heating temperature and PP recovery rate in separation of an separation object including PP and PS. FIG. 5 is a diagram showing a relationship between primary heating temperature and PP purity in separation of an separation object including PP and PS. PP purity (%) as represented by the ordinate of FIG. 5 is a percentage (%) of a PP quantity recovered through tertiary heating among a total quantity of resins recovered through the tertiary heating.

The solid line shown in FIG. 4 is a curve representing heating and pressurization applied for 30 seconds under a pressurizing force of 20,000 kgf. When the primary heating temperature was equal to or less than 40 degrees C., since PP did not adhere to the separating member 3, the separating member 3 was not able to retain PP and separation and recovery of PP was not achieved. When heating was performed at a primary heating temperature ranging from 60 degrees C. to 90 degrees C., both inclusive, the adhesive strength of PP increased, and by performing secondary and tertiary heating operations, it was possible to raise both the purity and the recovery rate of PP to 100%.

Moreover, the dotted line shown in FIG. 4 is a curve representing heating and pressurization applied for 30 seconds under a pressurizing force of 40,000 kgf which, since the adhesive strength of PP increases at a temperature equal to or greater than 15 degrees C., enabled the purity and recovery rate of PP to reach 100%. As shown, in conditions where the pressurizing force is high, it was possible to separate PP at low temperatures. However, damage to the separating member occurred when the pressurizing force exceeded 40,000 kgf.

In addition, as shown in FIG. 5, since a primary heating temperature of 100 degrees C. or higher exceeds not only the glass transition temperature of PP but also the glass transition temperature of PS, the shape of PS could not be restored through secondary heating and the purity of PP declined.

In summary, with a separation object including both PP and PS, it was found that primary heating required a temperature ranging from 15 degrees C. to 90 degrees C., both inclusive, and that it is even more preferable to perform primary heating within a range from and including 60 degrees C. to and including 90 degrees C. when the pressurizing force is 20,000 kgf.

Figure 6:
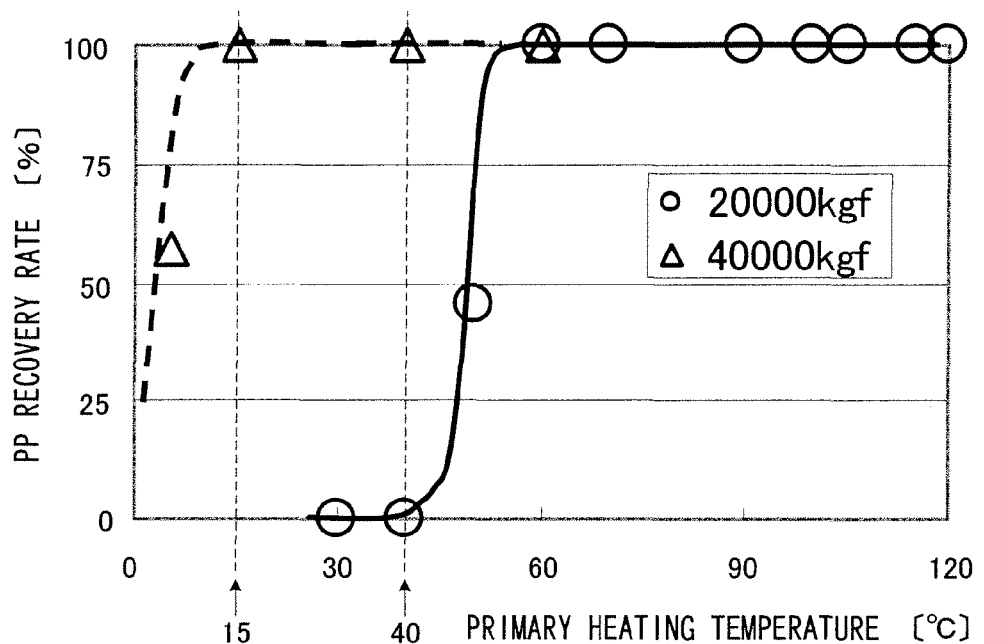
FIG. 6 is a relationship diagram of primary heating and PP recovery rate in a PP-ABS separation object.
Figure 7:
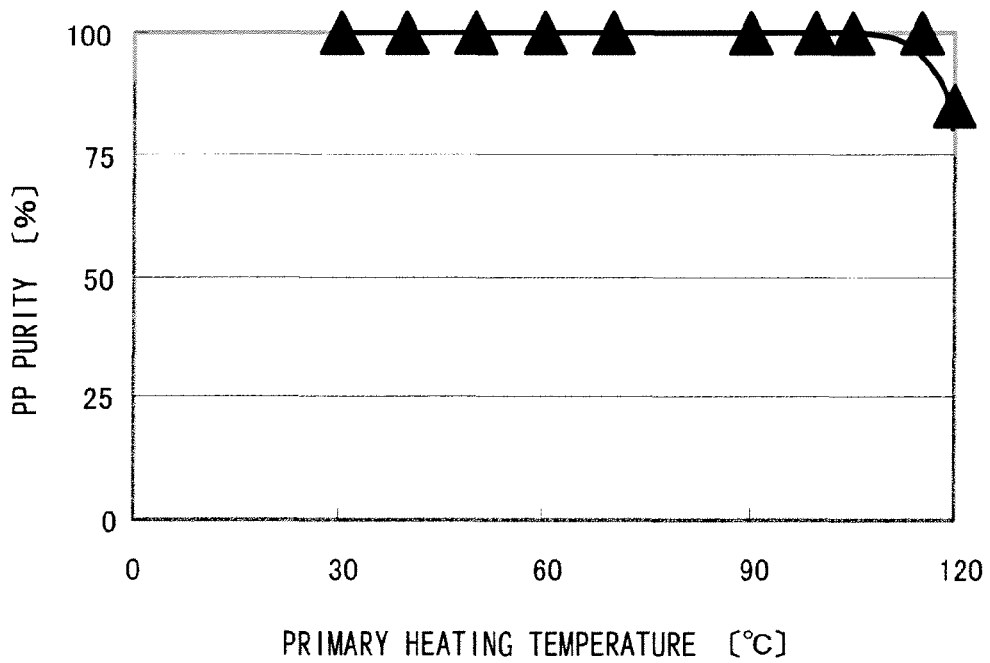
FIG. 7 is a relationship diagram of primary heating and PP purity in a PP-ABS separation object.

FIG. 6 is a diagram showing a relationship between primary heating temperature and PP recovery rate in separation of a separation object including PP and ABS. FIG. 7 is a diagram showing a relationship between primary heating temperature and PP purity in separation of a separation object including PP and ABS.

As shown in FIGS. 6 and 7, a similar tendency as in the separation of a separation object including PP and PS was verified. As shown in FIG. 6, when the primary heating temperature was equal to or less than 40 degrees C., PP could not adhere to and be retained by the separating member 3 and therefore could not be recovered. When the primary heating temperature ranged from 60 degrees C. to 110 degrees C., both inclusive, the adhesive strength of PP increased, and by performing secondary and tertiary heating operations, it was possible to raise both the purity and the recovery rate of PP to 100%. Moreover, the dotted line shown in FIG. 6 is a curve representing heating and pressurization applied for 30 seconds under a pressurizing force of 40,000 kgf which, since the adhesive strength of PP increases at a temperature of 15 degrees C. or higher, enabled the purity and recovery rate of PP to reach 100%.

In addition, as shown in FIG. 7, since a primary heating temperature of 120 degrees C. or higher exceeds not only the glass transition temperature of PP but also the glass transition temperature of ABS, the shape of ABS could not be restored through secondary heating and the purity of PP decreased.

In summary, with a separation object including PP and ABS, it was found that primary heating required a temperature ranging from 15 degrees C. to 110 degrees C., both inclusive, and that it is even more preferable to perform primary heating between 60 degrees C. to 110 degrees C., both inclusive, when the pressurizing force is 20,000 kgf.

—Influence of Secondary Heating Temperature—

Figure 8:
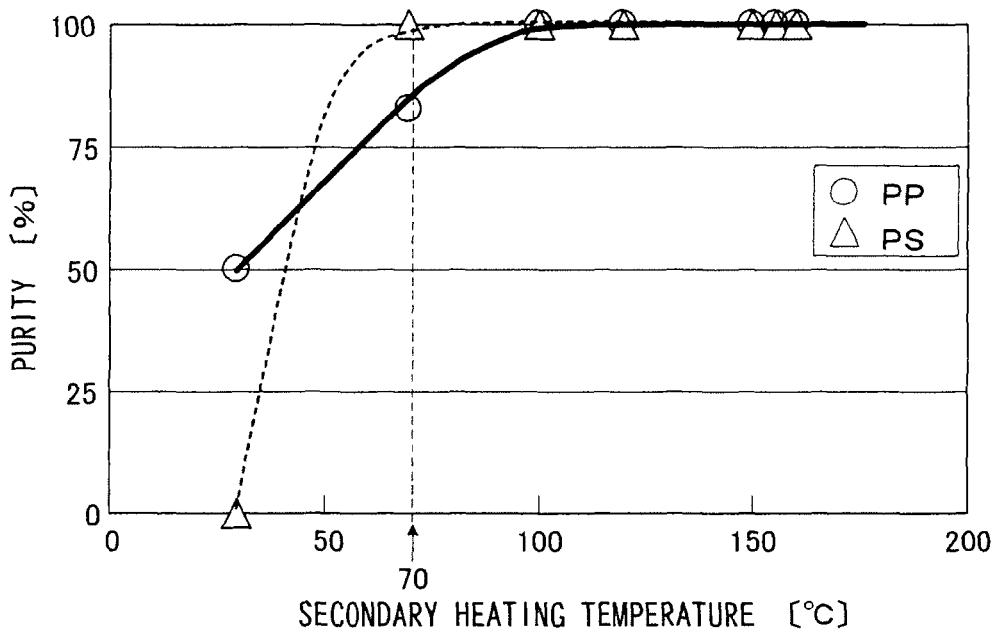
FIG. 8 is a relationship diagram of secondary heating and PP and PS purities in a PP-PS separation object.
Figure 9:
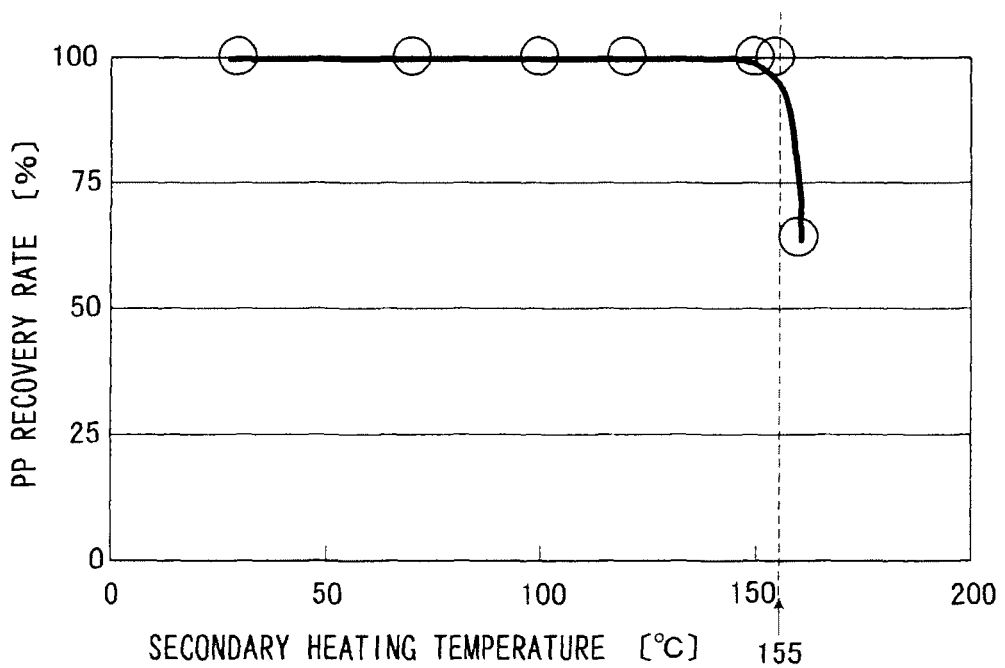
FIG. 9 is a relationship diagram of secondary heating and PP recovery rate in a PP-PS separation object.

FIG. 8 is a diagram showing a relationship between secondary heating temperature and purities of PP and PS in separation of a separation object including PP and PS. FIG. 9 is a diagram showing a relationship between secondary heating temperature and PP recovery rate in separation of a separation object including PP and PS.

PS purity (%) as indicated by the ordinate of FIG. 8 is a percentage (%) of a PS quantity detached and recovered through secondary heating among a total quantity of resins detached and recovered through the secondary heating. On the other hand, PP purity (%) as indicated by the ordinate of FIG. 8 is a percentage (%) of a PP quantity recovered through tertiary heating among a total quantity of resins separated and recovered through the tertiary heating after performing secondary heating at a predetermined temperature.

As shown in FIG. 8, when the secondary heating temperature is 70 degrees C. or lower, since the secondary heating temperature is lower than the primary heating temperature and the shape of PS is not restored to a state before pressurization, PS could not be detached from the separating member 3 and efficient separation of PP and PS could not be performed. By raising the secondary heating temperature to 70 degrees C. or higher, since the shape of PS began restoration, PS detached from the separating member, making it possible to separate PP from PS.

When heating was performed for 20 seconds at a secondary heating temperature ranging from 100 degrees C. to 155 degrees C., both inclusive, it was possible to raise PP purity to 100%. In addition, as shown in FIG. 9, when the secondary heating temperature was raised to over 155 degrees C., PP melted and adhered to the separating member 3, causing a decline in the PP recovery rate.

Similar verifications conducted on other resins listed in [Table 1] revealed that it is necessary to perform secondary heating at a temperature lower than the melting point of a resin whose melting point is the lowest among the separation object and higher than the primary heating temperature.

In summary, it was found that, with a separation object including PP and PS, a separation object including PP and ABS, and a separation object including PP, PS and ABS, it is necessary to perform secondary heating at a temperature ranging from 70 degrees C. to 155 degrees C., both inclusive, and higher than the primary heating temperature, and that it is even more preferable to perform secondary heating at a temperature ranging from 100 degrees C. to 155 degrees C., both inclusive, and higher than the primary heating temperature.

Influence of Resin Thickness

In a case where a shape variation among the separation object is considerable, since a variation in pressure occurs during pressurization and favorable adherence phenomena cannot be obtained, it is preferable to equalize the thickness of the separation object in advance. It was found that, with the thickness of resin in a pressure direction, when the difference between a minimum thickness and a maximum thickness was within 5.5 mm, pressure can be applied more or less evenly and favorable adherence phenomena can be obtained.

In order to study the influence of thickness, thickness adjustment was performed with a flat plate press machine using a spacer. [Table 2] presented below shows measurements of purities and recovery rates of PP and PS with respect to a range of thickness of a separation object in a pressure direction.

TABLE 2

| Range of thickness in pressure direction [mm] | PP recovery rate [%] | PS recovery rate [%] | PP purity [%] | PS purity [%] |
|---|---|---|---|---|
| 0.5 to 6.0 | 76 | 79 | 100 | 91.2 |
| 1.0 to 6.0 | 89 | 94 | 100 | 98.4 |
| 1.0 to 3.0 | 100 | 100 | 100 | 100 |

A separating member 3 and a separation object were placed on a pressure plate of a flat plate pressing machine, and were pressurized for 60 seconds after inserting a 6.0 mm spacer so as to attain a predetermined thickness. Subsequently, by removing resin having a thickness of less than 0.5 mm, a thickness in the pressure direction was equalized to a range from 0.5 mm to 6.0 mm, both inclusive, and the difference between minimum thickness and maximum thickness was adjusted to within 5.5 mm. In this case, a PS purity equal to or greater than 90% was achieved. Combining the above-described method with other resin separating methods enables reuse of resin at many resin material manufacturers and is therefore preferable.

In the same manner, a PS purity of 98% or higher was achieved when the resin thickness was equalized to a range from 1.0 mm to 6.0 mm, both inclusive, through thickness adjustment using a spacer and the like, which is more preferable since a PS purity of 98% higher enables direct reuse by resin material manufacturers as recycle material.

Furthermore, equalizing the resin thickness to a range from 1.0 mm to 3.0 mm, both inclusive, increased the purities and recovery rates of PP and PS to 100%, respectively, and is therefore even more preferable.

Similar verifications conducted on other resins listed in [Table 1] resulted in the same phenomenon as PP and PS being verified for other resins.

Influence of Rate of Temperature Increase During Secondary Heating

Figure 10:
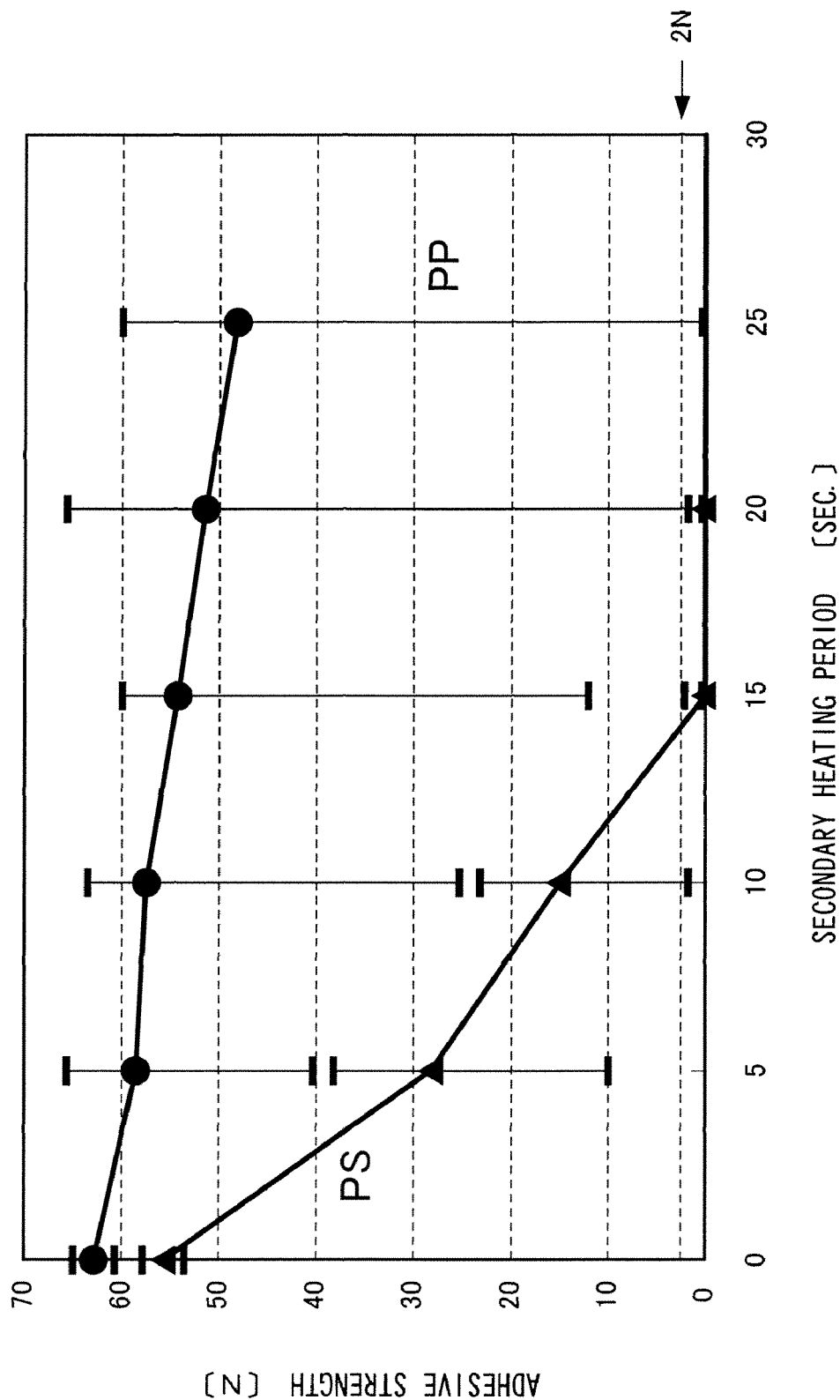
FIG. 10 is a relationship diagram of secondary heating period and adhesive strengths of PP and PS to a separating member in separation of a separation object including PP and PS.

FIG. 10 is a diagram showing a relationship between secondary heating periods and adhesive strengths of PP and PS to the separating member in separation of a separation object including PP and PS. A separation object was used whose thickness in a pressure direction was equalized to a range from 0.5 mm to 6.0 mm, both inclusive. As for the adhesive strengths of PP and PS, a force gauge, FGP-20, manufactured by NIDEC-SHIMPO CORPORATION, was used and shear stress in a direction horizontal to the separating member was taken as measurements. An adhesive strength of zero is preferable in order to easily detach a separation object from a separating member by inclining or by minute vibrations. In addition, an adhesive strength of 2 N or greater is preferable in order to enable the separation object to remain adhering to and retained by the separating member in a stable manner. In other words, with the separation of a separation object including PP and PS, a favorable separation result can be obtained by setting the adhesive strength of PS to zero and the adhesive strength of PP so as to equal or exceed 2 N after secondary heating.

As shown in FIG. 10, it was found that the adhesive strength of PS declined as the secondary heating period was extended and reached zero when the secondary heating period became equal to or longer than 20 seconds. As for the adhesive strength of PP, no decline in adhesive strength was observed for PP with a thickness of 1 mm or more. However, with PP whose thickness was equal to or less than 1 mm, it was found that the adhesive strength declined as the secondary heating period was extended, and when the secondary heating period became equal to or greater than 20 seconds, the adhesive strengths of some portions of PP dropped to or below 2 N, causing declines in PS purity and PP recovery rate.

In this light, measures for suppressing a decline in adhesive strength of PP whose thickness is equal to or less than 1 mm were considered. As a result, a measure was found in which, by arranging the rate of temperature increase of PP during secondary heating to be lower than the rate of temperature increase of PS, the secondary heating period of PP is substantially reduced and a decline in adhesive strength of PP during the secondary heating is suppressed.

Figure 11:
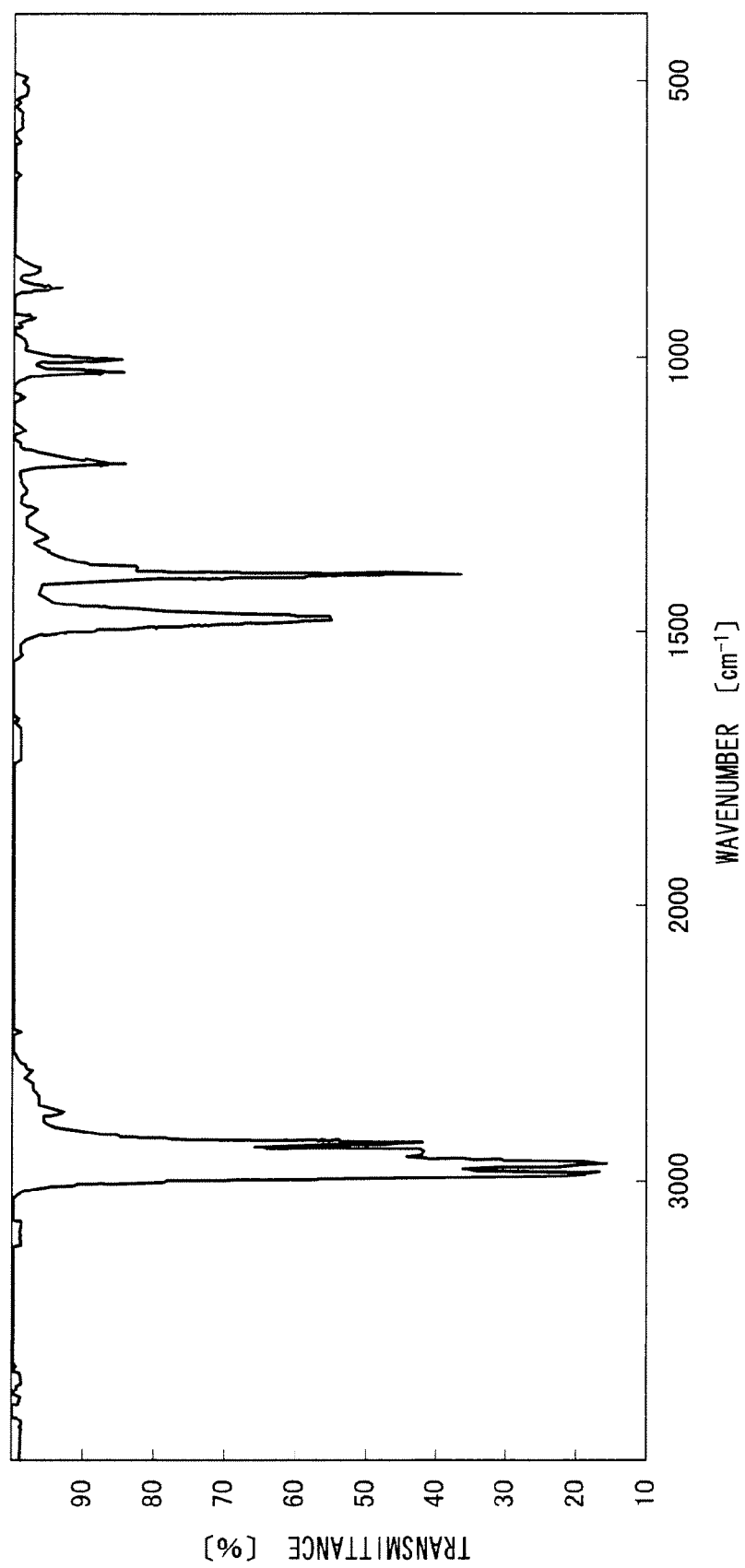
FIG. 11 is a diagram showing the infrared absorption characteristics of PP.
Figure 12:
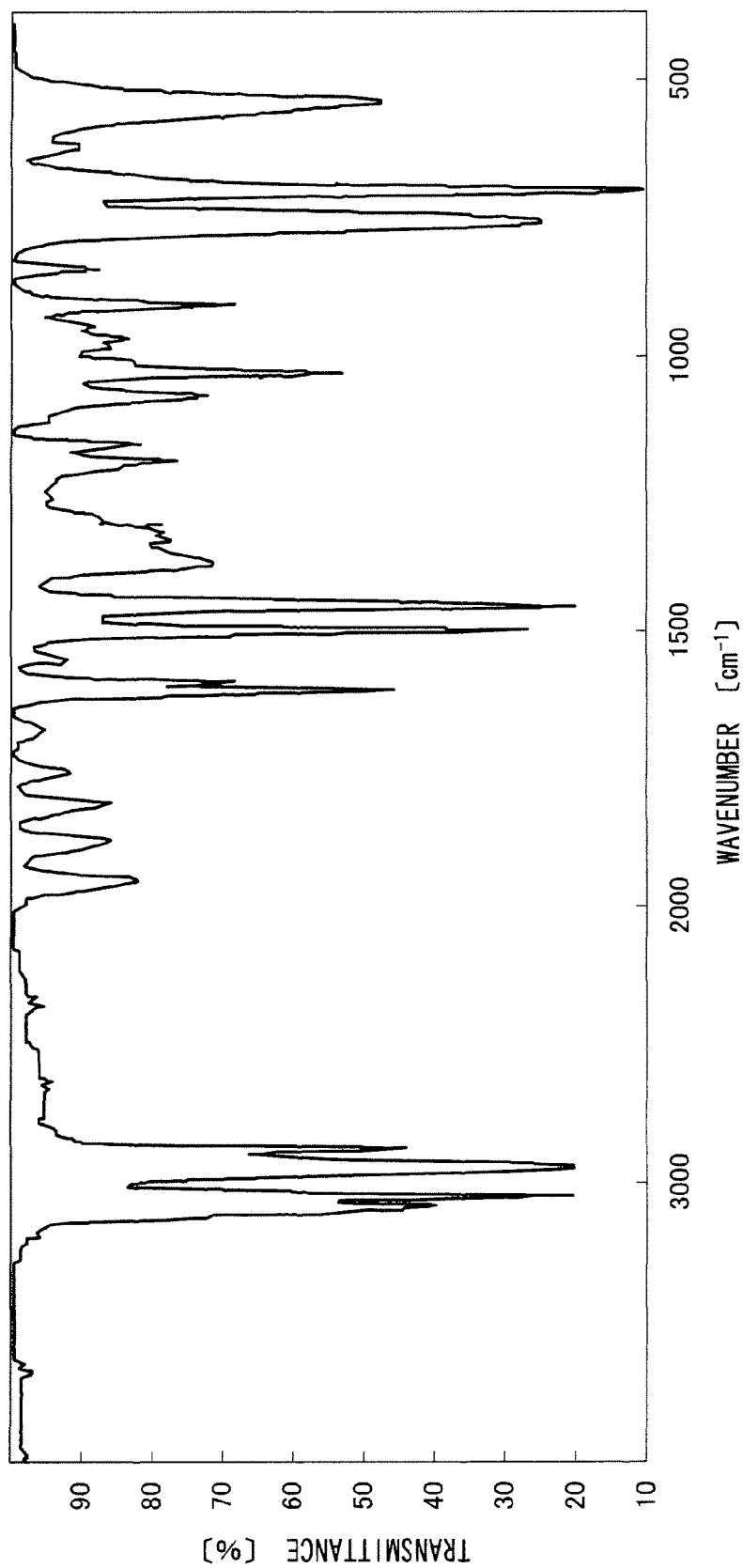
FIG. 12 is a diagram showing the infrared absorption characteristics of PS.
Figure 13:
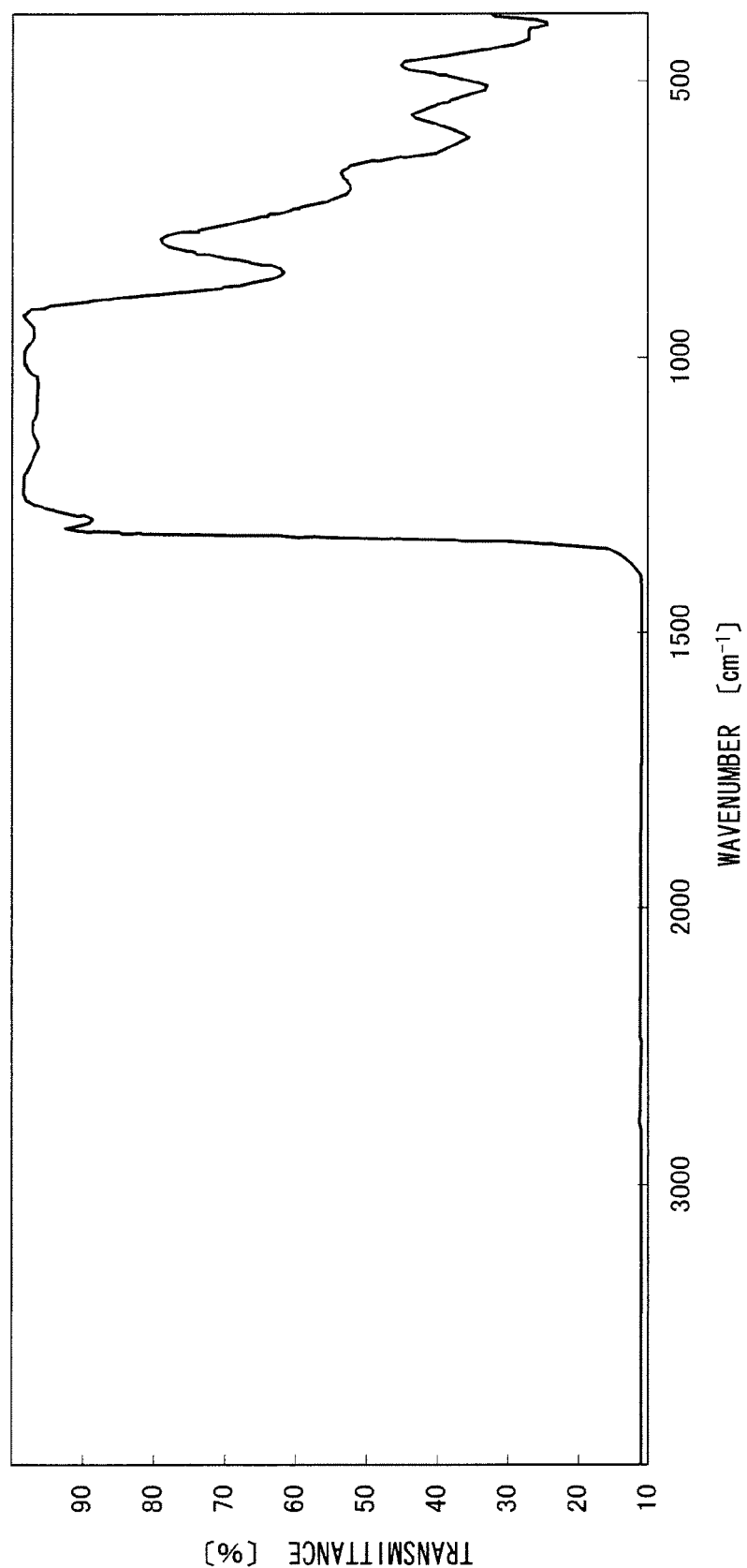
FIG. 13 is a diagram showing the characteristics of a secondary heating unit.

The rates of temperature increase of PP and PS can be readily controlled utilizing differences in the infrared absorption characteristics of resins. FIGS. 11 and 12 are diagrams showing infrared absorption curves of PP and PS. By irradiating infrared light in a band ranging from 500 to 1200 cm$^{-1}$ which is not absorbed by PP and absorbed only by PS, PS is preferentially heated. In addition, as a result of actually heating PP and PS simultaneously using a germanium infrared filter and a near-infrared panel heater having characteristics as shown in FIG. 13, it was verified at a high repeatability that the rate of temperature increase of PP declines in comparison to the rate of temperature increase of PS.

[Table 3] shows measurements of purities and recovery rates of PP and PS when the rate of temperature increase of PP was reduced and the substantial heating period at an elevated/reached temperature (150 degrees C.) was shortened by 5 seconds with respect to PS by performing secondary heating for separation of a separation object including PP and PS using the germanium infrared filter and the near-infrared panel heater described above. For comparison, results of secondary heating by a hot plate are also shown. From [Table 3], it was verified that the purities and recovery rates of PP and PS are improved by reducing the heating period of PP.

TABLE 3

| Secondary heating means | PP recovery rate [%] | PS recovery rate [%] | PP purity [%] | PS purity [%] |
| --- | --- | --- | --- | --- |
| Near-infrared heater & infrared filter | 96 | 90 | 100 | 98 |
| Hot plate | 76 | 79 | 100 | 91 |

Figure 14:
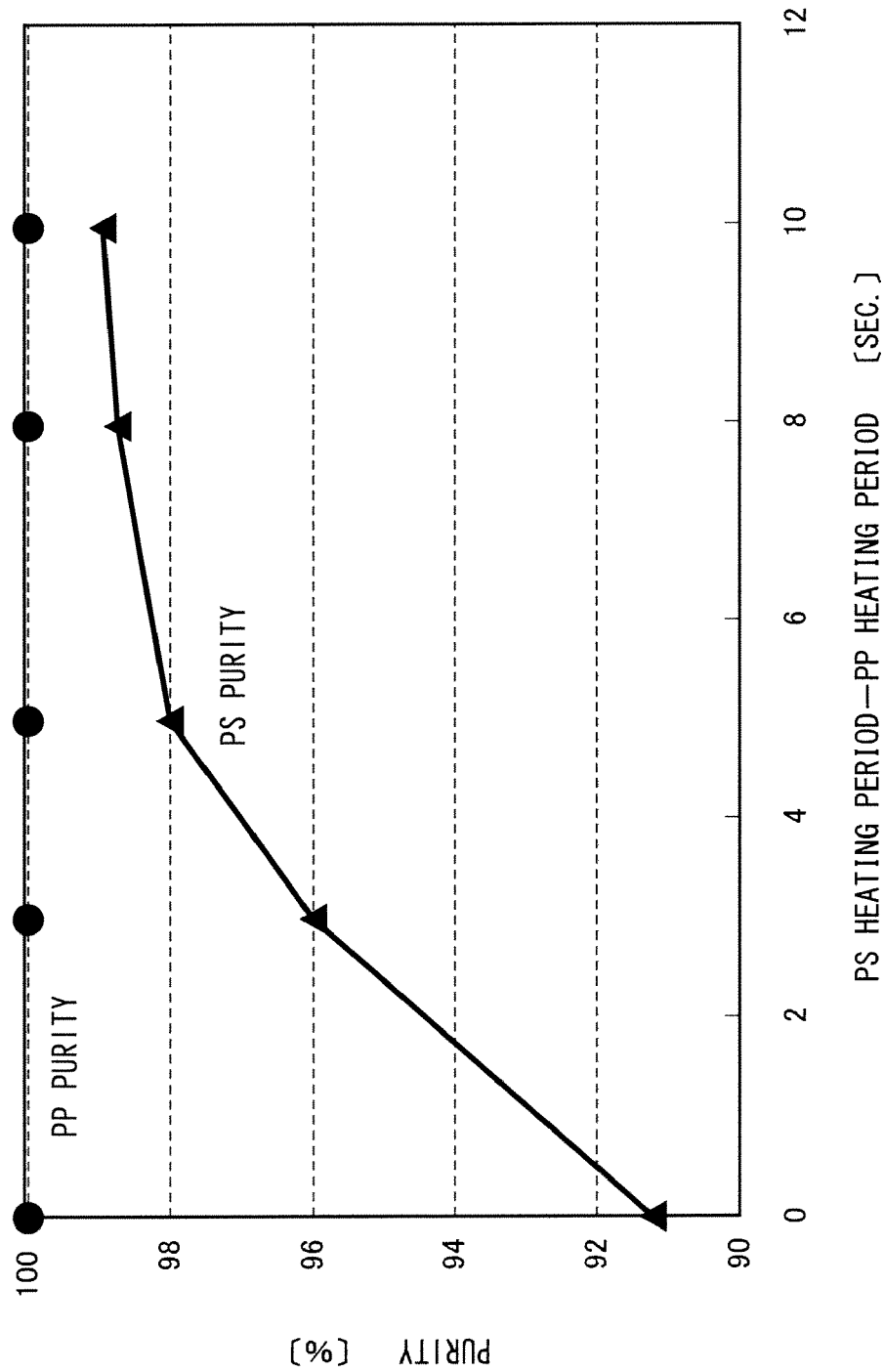
FIG. 14 is a relationship diagram of differences between heating periods of PP and PS at an elevated/reached temperature and PP and PS purities.

FIG. 14 is a diagram showing a relationship between the difference of heating periods of PP and PS at an elevated/reached temperature and PP and PS purities. It was found that, by reducing the heating period of PP by at least 5 seconds, the purity of PS resin equaled or exceeded 98%, attaining a purity that enables direct reuse by resin material manufacturers as recycle material. However, since the adhesive strength after secondary heating of parts of PP begins to drop to or below 2 N when the period until PP reaches the elevated/reached temperature, i.e., temperature increase period, exceeds 60 seconds, the heating period of PP is preferably shorter than the heating period of PS by at least 5 seconds and the heatup period is preferably equal to or shorter than 60 seconds.

Second Embodiment

Figure 15A:
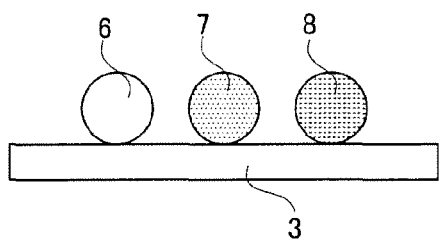
FIGS. 15A to 15F are cross-sectional process drawings showing a method of separating resin according to a second embodiment of the present invention.
Figure 15B:
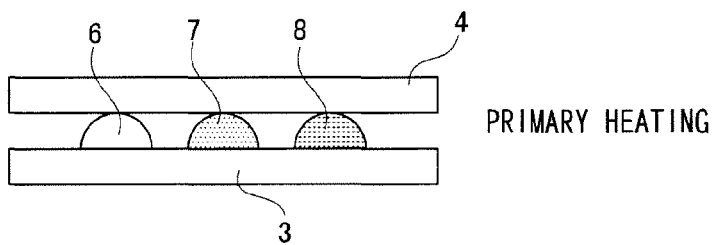
Figure 15C:
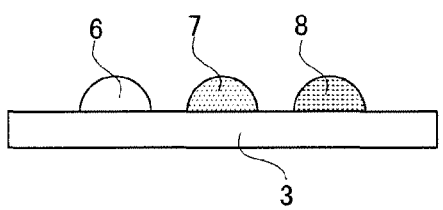
Figure 15D:
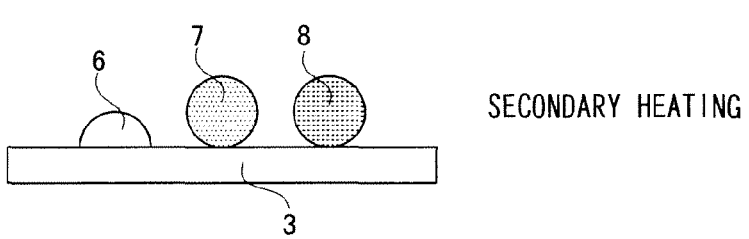
Figure 15E:
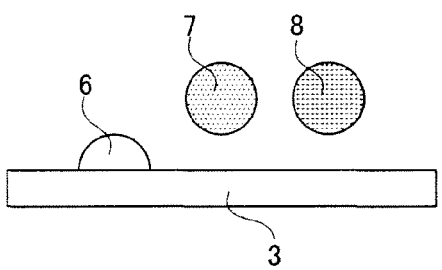
Figure 15F:
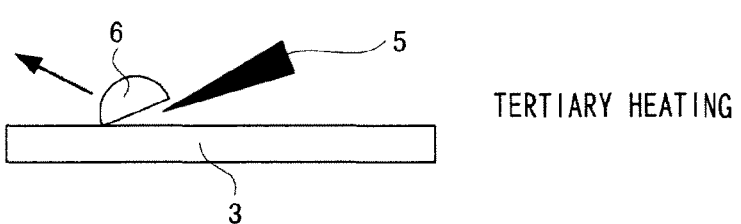
Figure 16:
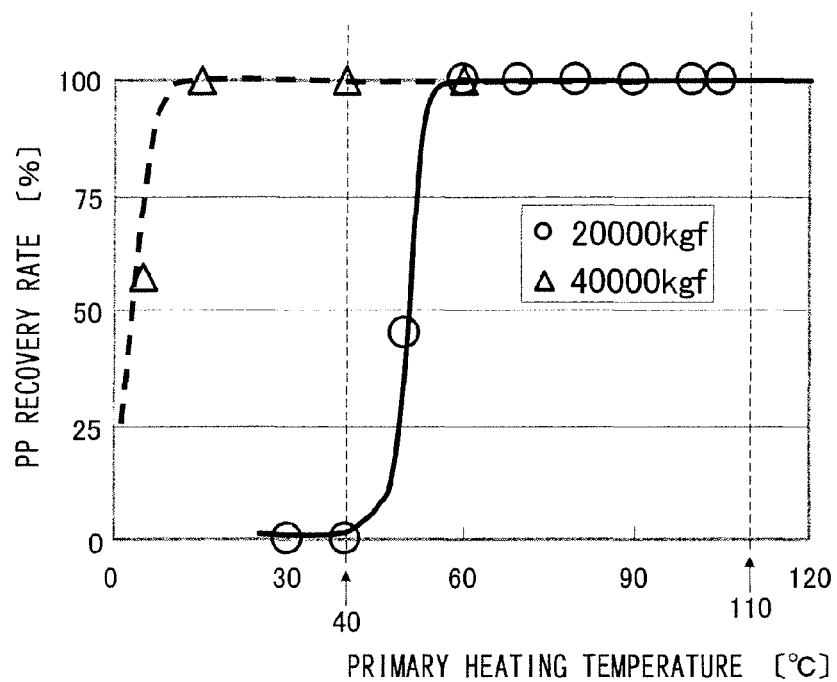
FIG. 16 is a relationship diagram of primary heating and PP recovery rate in a PP-PS-ABS separation object.
Figure 17:
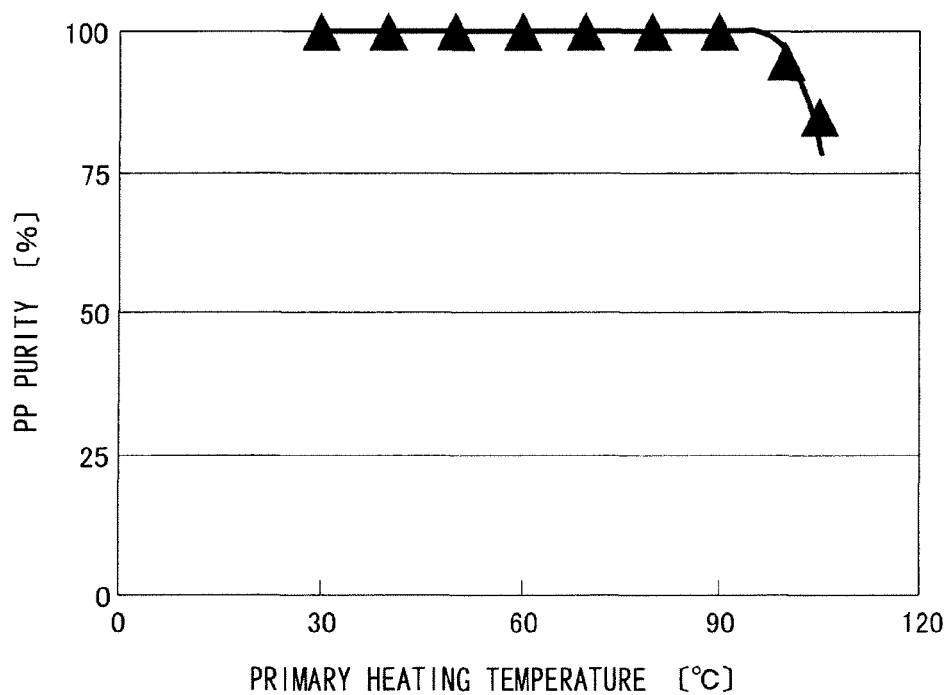
FIG. 17 is a relationship diagram of primary heating and PP purity in a PP-PS-ABS separation object.

FIGS. 15 to 17 show a second embodiment of the present invention.

FIGS. 15A to 15F show processes of separating resin from a separation object including a mixture of three types of resin having different glass transition temperatures and yield stresses, namely, a first resin 6, a second resin 7, and a third resin 8.

In FIG. 15A, the separation object is placed on a separating member 3. In this case, the glass transition temperature of the first resin 6 is lower than the glass transition temperature of the second resin 7. The glass transition temperature of the second resin 7 is lower than the glass transition temperature of the third resin 8.

In FIG. 15B, primary heating is applied. The heating temperature at this point is equal to or higher than the glass transition temperature of the first resin 6 and lower than the glass transition temperatures of the second resin 7 and the third resin 8.

The first resin 6, the second resin 7 and the third resin 8 are pressed against the separating member 3 by a flat plate 4. The pressurizing force is equal to or greater than the compressive yield stress of the first resin 6. By heating and pressurizing the first resin 6, the second resin 7 and the third resin 8 in this state, at least the first resin 6 adheres to the separating member 3.

In addition, when the pressurizing force of the heating and pressurizing is equal to or greater than the respective compressive yield stresses of the second resin 7 and the third resin 8, although the second resin 7 and the third resin 8 respectively deform in shape and adhere to the separating member 3, since the deformation occurs at a temperature lower than the glass transition temperatures, by applying a heat history higher than the pressurizing temperature after pressure release, the shapes are restored to a state before pressurization and the resins detach themselves from the separating member 3.

Furthermore, when the pressurizing force of the heating and pressurizing is smaller than the compressive yield stresses, the second resin 7 and the third resin 8 do not adhere to the separating member 3.

Next, as shown in FIG. 15C, by releasing the pressurizing force, in a case where the second resin 7 and the third resin 8 do not adhere to the separating member 3, the second resin 7 and the third resin 8 can be separated from the first resin 6 adhering to the separating member 3 by inclining or minutely vibrating the separating member 3 due to the same reasons as in the first embodiment.

In FIG. 15D, by performing secondary heating at a temperature higher than the primary heating temperature and lower than the melting point of a resin whose melting point is the lowest among the first resin 6, the second resin 7 and the third resin 8, the shapes of the second resin 7 and the third resin 8 are restored to states before pressurization and the second resin 7 and the third resin 8 assume states not adhering to the separating member 3 or states in which an adhesive strength is significantly low. Therefore, by inclining or minutely vibrating the separating member 3, the second resin 7 and the third resin 8 can be separated from the first resin 6 as shown in FIG. 15E.

The first resin 6 adhering to and retained by the separating member 3 can be recovered by scratching off with a blade 5 or the like as shown in FIG. 15F. At this point, the first resin 6 can be easily separated from the separating member 3 by applying tertiary heating to the first resin 6 to reduce a modulus of elasticity of the first resin 6.

As shown, it was found that when three types of resins with different glass transition temperatures and yield stresses are mixed, a method is preferable in which resins in the order of ascending glass transition temperatures are caused to adhere to and be retained by the separating member 3 to increase purity. Moreover, separation of the second resin 7 and the third resin 8 detached from the separating member 3 can be achieved by repeating similar operations.

FIG. 16 is a diagram showing a relationship between primary heating temperature and PP recovery rate in separation of a separation object including PP, PS and ABS. FIG. 17 is a diagram showing a relationship between primary heating temperature and PP purity in separation of a separation object including PP, PS and ABS.

As shown in FIG. 16, when the primary heating temperature was equal to or less than 40 degrees C., since PP did not adhere to the separating member 3, PP could not adhere to and be retained by the separating member 3 and separation and recovery of PP could not be performed. When heating was performed at a primary heating temperature ranging from 60 degrees C. to 90 degrees C., both inclusive, by subsequently performing secondary and tertiary heating operations, it was possible to raise both the purity and the recovery rate of PP to 100%. Moreover, the dotted line shown in FIG. 16 is a curve representing heating and pressurization applied for 30 seconds under a pressurizing force of 40,000 kgf which, since the adhesive strength of PP increases to a temperature of 15 degrees C. or higher, enabled the purity and recovery rate of PP to reach 100%.

In addition, as shown in FIG. 17, since a primary heating temperature that is equal to or greater than 100 degrees C. exceeds not only the glass transition temperature of PP but also the glass transition temperature of PS, the shape of PS could not be restored through secondary heating and detachment could not be performed.

In summary, with a separation object including PP, PS and ABS, it was found that primary heating required a temperature ranging from 15 degrees C. to 90 degrees C., both inclusive, and that it is even more preferable to perform primary heating in a range from 60 degrees C. to 90 degrees C., both inclusive, when the pressurizing force is 20,000 kgf.

Third Embodiment

FIG. 18 shows a third embodiment of the present invention.

FIGS. 18A to 18F show processes of separating resin from a separation object including a mixture of three types of resin having different glass transition temperatures and yield stresses, namely, a first resin 6, a second resin 7, and a third resin 8 in a manner similar to the second embodiment.

Figure 18A:
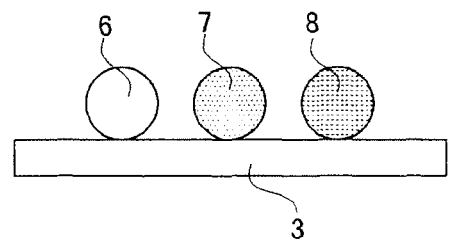
FIGS. 18A to 18F are cross-sectional process drawings showing a method of separating resin according to a third embodiment of the present invention.

In FIG. 18A, the separation object is placed on a separating member 3. In this case, the glass transition temperature of the first resin 6 is lower than the glass transition temperature of the second resin 7. The glass transition temperature of the second resin 7 is lower than the glass transition temperature of the third resin 8.

Figure 18B:
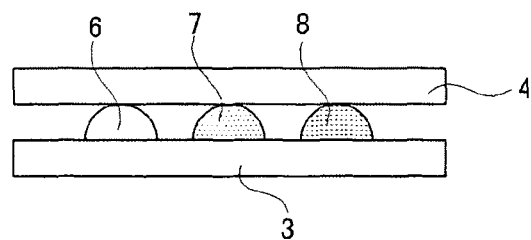

In FIG. 18B, primary heating is applied. The heating temperature at this point is equal to or higher than the glass transition temperatures of the first resin 6 and the second resin 7, and lower than the glass transition temperature of the third resin 8.

At this point, the first resin 6, the second resin 7 and the third resin 8 are pressed against the separating member 3 by a flat plate 4. The pressurizing force is equal to or greater than the compressive yield stress of a resin whose compressive yield stress is higher among the first resin 6 and the second resin 7. By heating and pressurizing the first resin 6, the second resin 7 and the third resin 8 in this state, at least the first resin 6 and the second resin 7 adhere to the separating member 3. In other words, since the first resin 6 and the second resin 7 are heated and pressurized at a temperature equal to or higher than the glass transition temperatures of the first resin 6 and the second resin 7 and by a force equal to or greater than the respective compressive yield stresses of the first resin 6 and the second resin 7, the first resin 6 and the second resin 7 plastically deform and adhere to the separating member 3.

While the third resin 8 deforms in shape and adheres to the separating member 3 when the pressurizing force of the heating and pressurizing is equal to or greater than the compressive yield stress of the third resin 8, since the deformation occurs at a temperature lower than the glass transition temperature, by applying a heat history higher than the pressurizing temperature after pressure release, the shape was restored to a state before pressurization and the third resin 8 detached itself from the separating member 3.

When the pressurizing force of the heating and pressurizing was smaller than the compressive yield stress of the third resin 8, the third resin 8 did not adhere to the separating member 3.

Figure 18C:
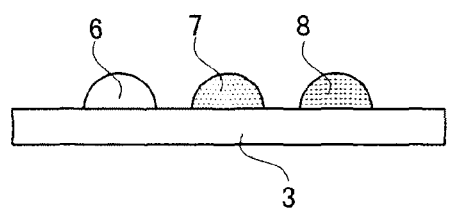
Figure 18D:
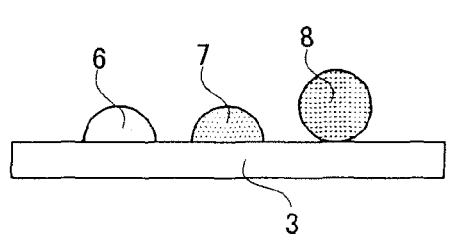

Next, by releasing the pressurizing force as shown in FIG. 18C, when the third resin 8 did not adhere to the separating member 3, the third resin 8 could be separated from adhering resins by inclining or minute vibrations due to the same reasons as in the first embodiment.

Figure 18E:
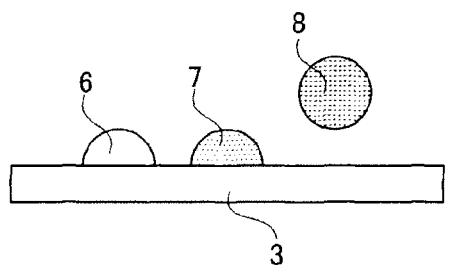

In FIG. 18B, secondary heating is applied. The temperature at this point is higher than the primary heating temperature and lower than the melting point of a resin whose melting point is the lowest among the first resin 6, the second resin 7 and the third resin 8. Accordingly, since the shape of the third resin 8 is restored to a state before pressurization and the third resin 8 assumes a state not adhering to the separating member 3 or a state where the adhesive strength is significantly low, the third resin 8 can be separated from the first resin 6 and the second resin 7 by inclining or minutely vibrating the separating member 3 as shown in FIG. 18E.

Figure 18F:
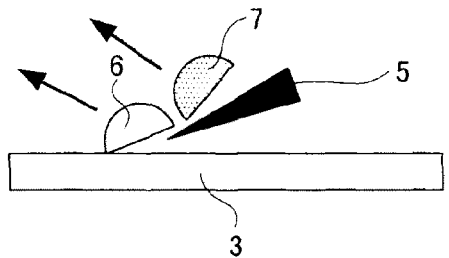

The first resin 6 and the second resin 7 adhering to and retained by the separating member 3 can be recovered by scratching off with a blade 5 or the like as shown in FIG. 18F. At this point, the first resin 6 and the second resin 7 can be easily separated from the separating member 3 by applying tertiary heating to the first resin 6 and the second resin 7 to reduce moduli of elasticity of the first resin 6 and the second resin 7.

As shown, it was found that when three types of resins with different glass transition temperatures and yield stresses are mixed, a method is preferable in which resins in the order of descending glass transition temperatures are caused to adhere to and be retained by the separating member 3 to enhance purity. Moreover, separation of the first resin 6 and the second resin 7 separated from the separating member 3 can be achieved by repeating similar operations.

Existence of Impurities

Even in a case where impurities other than a desired resin are included in a separation object, the desired resin can be separated from the separation object utilizing differences in glass transition temperatures and in yield stresses in the same manner.

When rubber, tape, low-melting resin and the like are included in impurity components, some of the impurities having adhered by heating and pressurization are not detached through secondary heating. Consequently, a portion of the impurities becomes mixed into a desired resin to be scraped off by a blade for detachment and recovery, thereby lowering the purity of the desired resin. In addition, when an impurity whose glass transition temperature is equal to or higher than the primary heating temperature is included in the impurity components, since a portion of the impurities are restored to their shapes before pressurization and the portion of the impurities are detached through secondary heating, the purity of a resin detached and recovered through the secondary heating declines. Furthermore, when metal, wood, paper and the like are included in the impurity components, since the impurities do not adhere to the separating member, the impurities can be separated from a desired resin.

As shown, when impurities are included in a separation object, although the purity of a desired resin varies according to the types and content of the impurities, it is possible to separate the desired resin. Therefore, the process according to the present invention is capable of separating a desired resin even if some impurities are mixed into the resin.

A verification experiment of high-purity separation of PP according to the present invention was conducted using, as a sample, a crushed-plastic separation object from discarded home appliances which included PP, PS and ABS as well as impurities. The sample was crushed waste having a maximum particle size of around 10.0 mm, obtained from a refrigerator that is a used home appliance by first removing internal parts such as a compressor and high-purity resin parts by manual separation, followed by crushing using a crushing machine, and finally removing metal and the like through processes such as separation by wind power, separation by magnetic force, and electrostatic separation.

Before performing PP separation, a portion of the sample was extracted in advance to analyze contents of PP and impurities in the sample through known infrared absorption analysis, densimetric analysis, visual observation and palpation. Measurements of PP content (%) in the sample, impurity content (%) in the sample, and purity (%) of the detached and recovered PP are shown in [Table 4] below.

TABLE 4

| PP content [%] | Impurities [%] | PP purity [%] |
|---|---|---|
| 38.6 | 2.3 | 99.1 |
| 38.6 | 1.1 | 99.6 |
| 38.6 | 0.5 | 99.9 |

From [Table 4], it was verified that a purity enabling reuse as a recycle material can be maintained even when impurities are mixed in.

As seen above, the present invention is particularly effective for separating PP, PS and ABS which are contained in used home appliances with notably high contents. The present invention is also effective for separating filler-added resin conventionally considered to be inseparable by densimetric separation and the like and for separating PLA and the like for which demands are expected to rise in the future.

The method for separating a separation object utilizing a difference in glass transition temperatures according to the present invention is applicable to the recycling of resins as resources, as a separation method for recycling specific resin material from fragments of mixed resin included in discarded home appliances and in general waste.

What is claimed is:
1. A method for separating resin comprising:
placing on a separating member a separation object including a mixture of at least a first resin and a second resin, the resins having distinct glass transition temperatures and distinct compressive yield stresses, the first resin having a lower glass transition temperature than the second resin;
applying a first heating and pressure treatment to the separation object, at a first heating temperature lower than a glass transition temperature of the second resin and higher than a glass transition temperature of the first resin, and under a pressurizing force equal to or greater than the compressive yield stress of the first resin, thereby causing at least the first resin to adhere to the separating member;
detaching from the separating member any material which is not adhering to or which has low adhesion to the separating member;
applying a second heating treatment to the separating member having at least the first resin adhered thereto, at a second heating temperature higher than the first heating temperature and lower than a melting temperature of each resin on the separation object, thereby causing only the first resin and any other resin having a glass transition temperature lower than the first heating temperature to remain adhered to the separating member, thereby separating the first resin from the second resin; and detaching the first resin and any other resin adhering to the separating member from the separating member.

2. The method of separating resin according to claim 1, wherein the first heating temperature is set to a temperature between a glass transition temperature of a resin whose glass transition temperature is the lowest and a glass transition temperature of a resin having a second lowest glass transition temperature among the mixture of resins.

3. The method of separating resin according to claim 1, wherein the first heating temperature is set to a temperature between a glass transition temperature of a resin whose glass transition temperature is the highest and a glass transition temperature of a resin having a second highest glass transition temperature among the mixture of resins.

4. The method of separating resin according to claim 1, wherein the pressurizing force is equal to or greater than 1.2 times the compressive yield stress.

5. The method of separating resin according to claim 1, wherein a difference between a maximum thickness and a minimum thickness of a resin in a pressure direction when placing the separation object onto the separating member is equal to or less than 5.5 mm.

6. The method of separating resin according to claim 1, wherein a thickness of a resin in a pressure direction when placing the separation object onto the separating member ranges from 0.5 mm to 6.0 mm, both inclusive.

7. The method of separating resin according to claim 1, wherein a thickness of a resin in a pressure direction when placing the separation object onto the separating member ranges from 1.0 mm to 6.0 mm, both inclusive.

8. The method of separating resin according to claim 1, wherein a thickness of a resin in a pressure direction when placing the separation object onto the separating member ranges from 1.0 mm to 3.0 mm, both inclusive.

9. The method of separating resin according to claim 1, wherein a rate of temperature increase during the second heating treatment of a resin whose glass transition temperature is lower than the first heating temperature, is lower than a rate of temperature increase during the second heating treatment of a resin whose glass transition temperature is higher than the first heating temperature.

10. The method of separating resin according to claim 1, wherein a heating duration of a resin whose glass transition temperature is lower than the first heating temperature at an elevated/reached temperature is reduced by at least 5 seconds compared to a resin whose glass transition temperature is higher than the first heating temperature and a heatup period of the resin whose glass transition temperature is lower than the first heating temperature is set to 60 seconds at the most by reducing a rate of temperature increase during the second heating treatment of the resin whose glass transition temperature is lower than the first heating temperature in comparison to a rate of temperature increase of the resin whose glass transition temperature is higher than the first heating temperature.

11. The method of separating resin according to claim 1, wherein the separation object includes at least one of polypropylene, polyethylene, polylactate, polyvinyl chloride, polystyrene, acrylonitrile styrene, acrylonitrile butadiene styrene, and polycarbonate.

12. The method of separating resin according to claim 1, wherein the separation object includes polypropylene and at least one of polystyrene and acrylonitrile butadiene styrene.

13. The method of separating resin according to claim 1, wherein
the separation object includes polypropylene and at least one of polystyrene and acrylonitrile butadiene styrene, the first heating temperature is set to at least 15 degrees C. and lower than glass transition temperatures of all resins other than polypropylene included in the separation object, and
the second heating temperature is set to a range from 70 degrees C. to 155 degrees C., both inclusive, and set higher than the first heating temperature.

14. The method of separating resin according to claim 1, wherein
the separation object includes polypropylene and at least one of polystyrene and acrylonitrile butadiene styrene, the first heating temperature is set to at least 15 degrees C. and lower than glass transition temperatures of all resins other than polypropylene included in the separation object, and
the second heating temperature is set to a range from 100 degrees C. to 155 degrees C., both inclusive, and set higher than the first heating temperature.

* * * * *